US012592863B2

(12) United States Patent　　　　　(10) Patent No.: US 12,592,863 B2
Spiers　　　　　　　　　　　　　　　　(45) Date of Patent:　　Mar. 31, 2026

(54) DIGITAL NETWORK SIMULATION AND GRAPH DATABASE FORMULATION FOR USE WITH A LARGE LANGUAGE MODEL

(71) Applicant: Insight Direct USA, Inc., Chandler, AZ (US)

(72) Inventor: Joshua Spiers, Renton, WA (US)

(73) Assignee: Insight Direct USA, Inc., Chandler, AZ (US)

( * ) Notice: Subject to any disclaimer, the term of this patent is extended or adjusted under 35 U.S.C. 154(b) by 0 days.

(21) Appl. No.: 18/798,084

(22) Filed: Aug. 8, 2024

(65) Prior Publication Data

US 2025/0055767 A1　　Feb. 13, 2025

Related U.S. Application Data

(60) Provisional application No. 63/531,453, filed on Aug. 8, 2023.

(51) Int. Cl.
G06F 15/173　　　(2006.01)
H04L 9/40　　　　(2022.01)
(Continued)

(52) U.S. Cl.
CPC ............ H04L 41/16 (2013.01); H04L 41/145 (2013.01); H04L 63/1416 (2013.01)

(58) Field of Classification Search
USPC ........................................................ 709/238
See application file for complete search history.

(56) References Cited

U.S. PATENT DOCUMENTS

2022/0247630 A1* 8/2022 Engi ................... H04L 41/0627
2022/0414228 A1* 12/2022 Difonzo ................ G06F 40/169
(Continued)

OTHER PUBLICATIONS

A. Attawar, S. Vora, p. Narechania, V. Sawant and H. Vora, "NLSQL: Generating and Executing SQL Queries via Natural Language Using Large Language Models," 2023 International Conference on Advanced Computing Technologies and Applications (ICACTA), Mumbai, India, 2023, pp. 1-6 (Year: 2023).

Primary Examiner — Wing F Chan
Assistant Examiner — Andrew Woo
(74) Attorney, Agent, or Firm — Kinney & Lange, P.A.

(57) ABSTRACT

A method of formulating a desired network configuration graph database representative of a network can include receiving network information regarding multiple devices; generating an existing network configuration graph database representative of the multiple devices; and determining whether each interface description for each device correctly describes the device by comparing each interface description to an actual state of the device. The method can include, in response to the interface description being inaccurate, generating an entry in an interface description database that includes identification information of the device, the incorrect interface description for the device, and a correct interface description for the device for each incorrect interface description; formulating the desired network configuration graph database representative of the multiple devices; providing the desired network configuration graph database and a first prompt to a large language model; and determining an output regarding the network and dependent upon the desired network configuration graph database.

20 Claims, 3 Drawing Sheets

(51) Int. Cl.
  H04L 41/14        (2022.01)
  H04L 41/16        (2022.01)

(56)                References Cited

U.S. PATENT DOCUMENTS

2024/0362214 A1   10/2024   Lyon
2024/0406210 A1   12/2024   Sellars et al.
2024/0414211 A1   12/2024   Boyer et al.
2024/0419835 A1   12/2024   Karlberg et al.
2025/0150345 A1    5/2025   Sun et al.

* cited by examiner

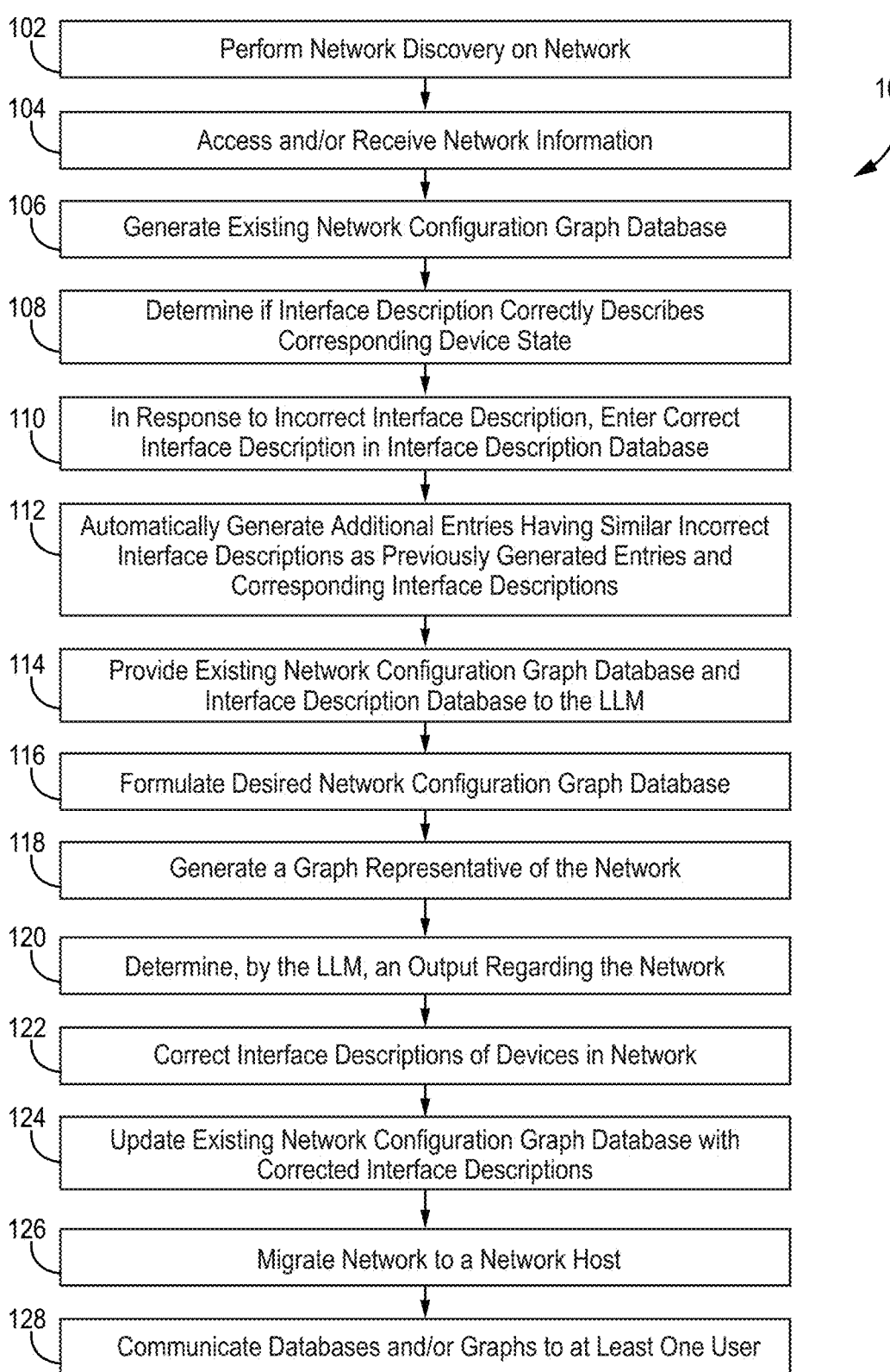

102 Perform Network Discovery on Network

104 Access and/or Receive Network Information

100

106 Generate Existing Network Configuration Graph Database

108 Determine if Interface Description Correctly Describes Corresponding Device State 110 In Response to Incorrect Interface Description, Enter Correct Interface Description in Interface Description Database 112 Automatically Generate Additional Entries Having Similar Incorrect Interface Descriptions as Previously Generated Entries and Corresponding Interface Descriptions 114 Provide Existing Network Configuration Graph Database and Interface Description Database to the LLM 116 Formulate Desired Network Configuration Graph Database 118 Generate a Graph Representative of the Network 120 Determine, by the LLM, an Output Regarding the Network 122 Correct Interface Descriptions of Devices in Network 124 Update Existing Network Configuration Graph Database with Corrected Interface Descriptions 126 Migrate Network to a Network Host 128 Communicate Databases and/or Graphs to at Least One User

FIG. 2

DIGITAL NETWORK SIMULATION AND GRAPH DATABASE FORMULATION FOR USE WITH A LARGE LANGUAGE MODEL

CROSS-REFERENCE TO RELATED APPLICATION

The present application claims priority to U.S. Provisional Application No. 63/531,453 filed Aug. 8, 2023 for "NETWORK MODELING AND VISUALIZATION" by J. Spiers, the disclosure of which is incorporated in its entirety by reference herein.

FIELD OF THE INVENTION

The disclosure relates generally to digital networks and, more particularly, to the formulation of graph databases and graphs to simulate/map the digital network to fix and/or improve the functionality of the digital network. The graph databases and/or graphs can potentially be used with and/or generated by a large language model.

BACKGROUND

A digital network, also referred to as a computer network, can be a group of computers and/or other devices that are connected in order to communicate and share resources. Digital networks can be and/or include local area networks (LANs), wide area networks (WANs), and/or other area networks, devices, configurations, and forms of communication. For example, the digital network can use ethernet, Wi-Fi, Bluetooth, internet protocol domain name system, and/or other networking technologies.

Digital networks can include any number of devices. For example, a digital network for a large company can include tens of thousands of interconnected devices. While digital networks can provide for the communication of information and sharing of resources across many devices, the large and complex interconnectedness of devices on a digital network can cause and/or experience issues that prevent this exchange of information and sharing of resources for one, multiple, or all devices on the digital network. Remedying these issues can be difficult and time consuming because the problem may not be easily discernable due to the size/extent of the digital network and the potential need to access and/or review each device.

SUMMARY

One embodiment of a method of formulating a desired network configuration graph database representative of a network can include receiving network information regarding multiple devices, a connectivity of each device to other devices, and interface descriptions of the multiple devices; generating an existing network configuration graph database representative of the multiple devices, the interconnectivity of the multiple devices, and the interface descriptions; and determining whether each interface description correctly describes the device and the connectivity of each device to other devices by comparing each interface description to an actual state of the corresponding device. The method can include, in response to the interface description incorrectly describing the device or the connectivity of each device to other devices, generating an entry in an interface description database that includes identification information of the device, the incorrect interface description for the device, and a correct interface description for the device for each incorrect interface description; formulating the desired network configuration graph database representative of the multiple devices, the interconnectivity of the multiple devices, and correct interface descriptions for each device of the multiple devices; providing the desired network configuration graph database and a first prompt to a large language model; and determining, by the large language model, an output regarding the network and dependent upon the desired network configuration graph database.

Another embodiment of a method of formulating a desired network configuration graph database corresponding to a network can include receiving information regarding devices on the network, the information including at least a device name, at least one connection of the device to another device, and at least an interface description for the device; generating an existing network configuration graph database representative of the devices on the network, the interconnectivity of the devices, and the interface descriptions of the devices; and comparing each interface description for each device to an actual state of the corresponding device on the network. The method can further include, in response to each interface description incorrectly describing the actual state of the corresponding device on the network, entering a correct interface description for each corresponding incorrect interface description for the devices in an interface description database; providing the existing network configuration graph database and the interface description database to a large language model; prompting the large language model to formulate the desired network configuration graph database that includes the information regarding the devices on the network having device names, connections of the devices to other devices, and correct interface descriptions for each device; and formulating, by the large language model, the desired network configuration graph database dependent upon the existing network configuration graph database and the interface description database.

BRIEF DESCRIPTION OF THE DRAWINGS

FIG. 2 is a method flow chart describing an example process for formulating a desired network configuration graph database and/or a desired network configuration graph for a network.

Figure 1:
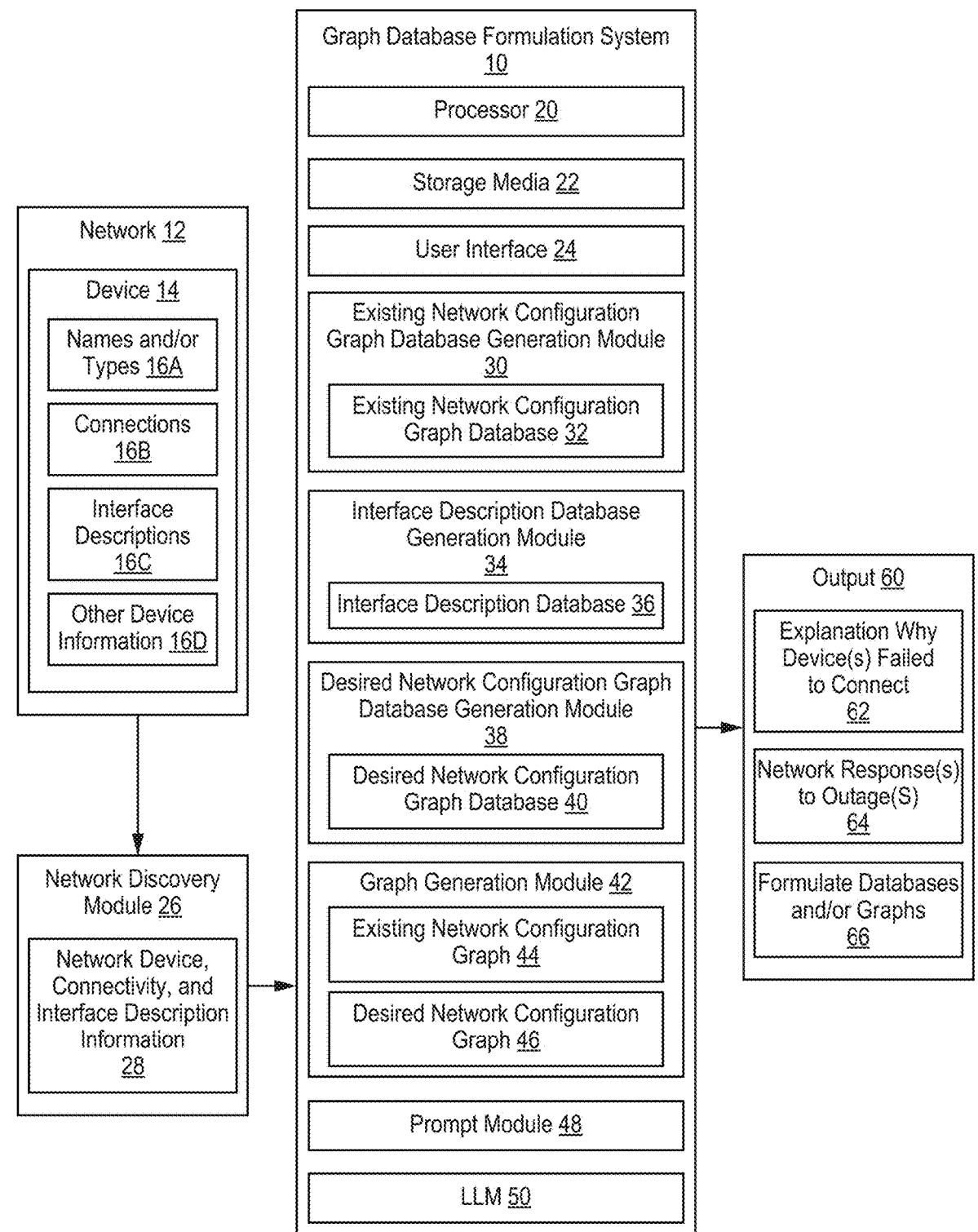
FIG. 1 is a block schematic diagram of an example graph database formulation system to simulate/map a network.

While the above-identified figures set forth one or more examples of the present disclosure, other examples/embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and examples of the present invention may include features and components not specifically shown in the drawings.

DETAILED DESCRIPTION

A system and related process are disclosed herein for formulating a desired network configuration graph database and/or a graph to simulate/map a digital network (hereinafter also referred to just as a "network"). The systems/processes can include using a large language model (hereinafter referred to as an "LLM") to formulate the desired network configuration graph database and/or the graph. The use of graph databases as well as an LLM allow for efficient management of large-scale network data/information. The graphs dependent upon the graph databases can allow for mapping that includes multiple layers, including network layers 1, 2, and/or 3. The disclosed systems/processes can correct any incorrect interface descriptions present in the network and also update this information in the existing network configuration graph database (which represents the information as it appears in the network). The correct interface descriptions replace the incorrect interface descriptions in a new, desired network configuration graph database. The correct interface descriptions describe the actual state of the corresponding device as found in the network, so the desired network configuration graph database correctly and accurately represents the network. Thus, the desired network configuration graph database is used to simulate/map the network via, for example, one or multiple graphs. The formulation of the desired network configuration graph database and/or the graphs can be performed by an LLM and/or by another system, component, module, etc. Additionally and/or alternatively, the LLM, with access to the desired network configuration graph database and/or other information dependent upon the network, can perform analyses and determine outputs regarding the network. For example, the LLM can be prompted with a request asking why a first device failed to connect to a second device, and the LLM can use the desired network configuration graph database to determine an output that answers this request. In another example, the LLM can be prompted to assume that one or multiple devices of the network have experienced an outage and can be requested to output a network response to that outage. In a third example, the LLM can be prompted to generate a graph of all or a portion of the network displaying any types of information, and the LLM can output the requested graph(s). The LLM can output other information dependent upon the desired network configuration graph database, the interface description graph database, the graphs, and/or other information.

The existing network configuration graph database, desired network configuration graph database, and/or graphs can be altered and/or continuously updated as the network changes so that any outputs by the LLM are accurate with respect to the network. Moreover, the desired network configuration graph database and/or graphs can be useful in migrating the network to a network host by providing information as to the actual network (including the actual layout/configuration of devices, connections, and associated information) to those responsible for the migration. These and other features, functions, capabilities, and/or advantages of the disclosed systems/processes are realized by reviewing the below disclosure.

FIG. 1 is a block schematic diagram of an example graph database formulation system 10 (hereinafter referred to as "system 10"). System 10 can formulate/generate various graph databases and/or graphs based upon and/or representative of network 12, which is a digital/computer network having any number of devices 14 having device names and/or types 16A, connections 16B, interface descriptions 16C, and/or other device information 18D. For example, network 12 can include tens of thousands of devices 14. System 10 can be in communication with, use, and/or include network discovery module 26. In one example, network discovery module 26 is a separate and distinct component/system from system 10 and, in another example, network discovery module 26 is a component within system 10 used to determine and/or collect network device, connectivity, and interface description information 28.

System 10 can include, among other components not expressly disclosed herein, processor 20, storage media 22, and user interface 24. Further, system 10 can include existing network configuration graph database generation module 30 (hereinafter referred to as "ENCGD generation module 30" or simply just "generation module 30") that can generate/formulate existing network configuration graph database 32 (hereinafter referred to as "ENCGD 32" or simply just "database 32"), interface description database generation module 34 that can generation/formulate interface description database 36, desired network configuration graph database generation module 38 (hereinafter referred to as "DNCGD generation module 38" or simply just "generation module 38") that can generate/formulate desired network configuration graph database 40 (hereinafter referred to as "DNCGD 40" or simply just "database 40"), graph generation module 42 that can generate/formulate existing network configuration graph 44 (hereinafter referred to simply as "graph 44") and/or desired network configuration graph 46 (hereinafter referred to simply as "graph 46"), prompt module 48, and/or LLM 50. In one configuration/example, system 10 can include LLM 50 such that LLM 50 is a component within system 10. In another configuration/example, LLM 50 can be a separate and distinct component/system that is at another location remote from system 10. Moreover, any of the components and/or functions of system 10 can be included and/or performed by LLM 50, such as network discovery module 26, ENCGD generation module 30, DNCGD generation module 38, and/or graph generation module 42.

System 10 can produce and/or otherwise provide output(s) 60 to any user, location, etc. Output 60 can include, for example, an explanation as to why device(s) failed to connect/perform 62, network response(s) to outage(s) 64, and/or the formulated databases and/or graphs 66. Output 60 can include other information not expressly disclosed herein. Any of the systems/components shown in FIG. 1 can communicate via the internet and/or other communication methods, such as wired and/or wireless communication.

FIG. 1 focuses on hardware components of graph database formulation system 10, and is provided as an illustrative example of a general hardware system for performing the capabilities discussed herein. The components presented in FIG. 1, particularly including modules 26, 30, 34, 38, 42, and 48 can be omitted or replaced with analogous hardware and/or software in different architectures without departing from the scope and spirit of the present disclosure.

Graph database formulation system 10 (and process 100 described with regards to FIG. 2) can include other steps, components, modules, configurations, and/or features not expressly disclosed herein that are suitable for generating databases 32, 36 and/or 38; graphs 44 and/or 46; and/or outputs 60, among other capabilities. For example, system 10 can include any number of digital/electronic storage media (e.g., storage media 22) for storing data, information, and/or executable instructions. System 10 can include any number of computer processors (e.g., processor 20) for performing tasks/instructions with regards to system 10 and/or process 100. Further, system 10 can allow for communication via wired or wireless communication methods between components of system 10 and/or between other components, systems, individuals/users, etc. distant from system 10. System 10 is described herein as including one or multiple "modules," which can be any hardware and/or software for performing the tasks, functionality, and/or capabilities described herein. These "modules" can be instantiated in dedicated hardware and/or software, and/or can be defined functionally and use shared hardware and/or software.

Additionally, system 10 can be a discrete assembly or be formed by one or more components capable of individually or collectively implementing the functionalities described herein. In some examples, system 10 can be implemented as a plurality of discrete circuitry subassemblies. In some examples, one or all components of system 10 can include and/or be implemented at least in part on a smartphone or tablet, among other options. In some examples, one or all components of system 10 can include and/or be implemented as downloadable software in the form of a mobile application. The mobile application can be implemented on a computing device, such as a personal computer, tablet, or smartphone, among other suitable devices. One or all components of system 10 can be considered to form a single computing device even when distributed across multiple component computing devices. System 10 can include a configuration in which one, some, or all of the functions described herein are performed by different components. System 10 can include various components for performing the above functions (as well as other functions described in this disclosure), such as processor 20, storage media 22, and/or user interface 24.

Graph database formulation system 10 can access, receive, and/or otherwise use network device, connectivity, and interface description information 28 (hereinafter also referred to as "information 28"), which can be collected/ determined by network discovery module 26 from network 12. As described above, network 12 can be a digital network having any number of devices 14 that are connected via connections 16B in order to communicate and/or share resources. For example, network 12 can be for a large company and can include tens of thousands of devices 14. Each device 14 on network 12 can have any characteristics and/or properties either inherent to each device 14 (e.g., the device type) and/or listed in information associated with each device 14, such as device names and/or types 16A, connections 16B of device 14 to other devices 14, interface descriptions 16C of each device 14, and/or other device information 16D. The other device information 16D can include, for example, a device availability, a device state, a pool name of the device, and/or an IP address of the device. Interface description 16C for each device 14 can be, for example, comments entered by the user/technician that set up and/or otherwise has access to device 14 and/or the configurations of device 14. These comments can include, for example, a description as to any of the characteristics and/or properties of the corresponding device 14, such as a comment describing the connections 16B of device 14 to other devices 14. In another example, the comments in the interface description 16C can describe device 14 names and/or types 16A, the specifications of device 14, and/or other information regarding device 14 not expressly disclosed herein. In some situations, as described below, interface descriptions 16C can incorrectly describe the characteristics and/or properties of the device 14. For example, connections 16B of device 14 can in actuality be that the first device 14 is connected to a first router and a fifth gateway; however, interface description 16C of that first device 14 can describe the connections 16B as being with a third router and a second gateway. Such incorrect interface descriptions 16C can cause problems with regards to the mapping/simulation of network 12 via ENCGD 32 and/or DNCGD 40 as described below.

Device 14 can be any type of element, component, module, and/or electronic system/apparatus, such as a router, a hub, a modem, a repeater, a switch, a bridge, an access point, a gateway, a firewall, a network interface card, an intrusion detection system, an intrusion prevention system, a virtual private network, network attached storage, and/or a load balancer. Network 12 can have any number of each of the above listed types of devices 14 and/or other types of devices 14.

Network discovery module 26 can be configured to determine network device, connectivity, and interface description information 28 (such as information 16A-16D) of one, multiple, or all devices 14 of network 12. Network discovery module 26 can include, communicate with, and/or function in conjunction with any of the components of system 10 (such as processor 20, storage media 22, and/or user interface 24). Network discovery module 26 can be a component of system 10 and/or can be a separate and distinct component/system from system 10. Network device module 26 can be configured to formulate/generate network device, connectivity, and interface description information 28 in any format, including in an electronic file, a physical file, and/or other formats/configurations. Network discovery module 26 can perform network discovery on network 12 once, periodically, and/or continuously as desired/needed to generate/ formulate information 28. In one example, network discovery module 26 continuously discovers/analyzes network 12 and provides the updated information 28 to system 10 as network 12 changes. In another example, only the changes to network 12 are provided as information 28 to system 10. In this example, if network 12 adds ten new devices 14 and deletes twenty other devices 14, network discovery module 26 can provide only those changes to system 10 without the need to provide information 28 regarding all devices 14, connections 16B, etc. to system 10. In another example, network device, connectivity, and interface description information 28 is provided directly to system 10 from network 12 without first being discovered and/or provided to network discovery module 26.

Network discovery module 26 can be in communication with network 12 and perform the network discovery of network 12 using any methods, formulas, algorithms, processes, etc. For example, network discovery module 26 can be and/or include a computer software program that scans network 12 to discovery devices 14 and/or information 16A-16D regarding devices 14. Network discovery module 26 can perform network discovery of network 12 using any method known to one of skill in the industry, and/or network discovery module 26 can perform network discovery via another method not expressly disclosed herein. Network discovery as performed by network discovery module 26 (and/or another module, component, system, etc. not expressly disclosed herein) can be performed manually as initiated and/or performed by a user and/or automatically as instructed by system 10 and/or as prompted by any instruction, event, etc. In one example, system 10 can begin the process of formulating ENCGD 32, which automatically triggers the performance of network discovery of network 12 by network discovery module 26. In another example, the discovery of network 12 can be automatically triggered/ performed in response to another event and/or can be automatically performed to update the configuration/information 28 of network 12 periodically and/or continuously.

Graph database formulation system 10 can access, receive, and/or otherwise use network device, connectivity, and interface description information 28 and/or any other information regarding network 12 to generate ENCGD 32, interface description database 36, DNCGD 40, graphs 44 and/or 46, and/or other information, such as output 60 based upon network 12.

System 10 (and/or the components of system 10) can include one or multiple computer/data processors 20 (also referred to herein as "processor 20"). In general, processor 20 can include any or more than one of a processor, a microprocessor, a controller, a digital signal processor (DSP), an application specific integrated circuit (ASIC), a field-programmable gate array (FPGA), or other equivalent discrete or integrated logic circuitry. Processor 20 can perform instructions stored within storage media 22 (or located elsewhere), and/or processor 20 can include memory such that processor 20 is able to store instructions and perform the functions described herein. Additionally, processor 20 can perform other computing processes described herein, such as the functions performed by any of the components of system 10.

System 10 (and/or the components of system 10) can also include storage media 22. Storage media 22 is configured to store information and, in some examples, can be described as a computer-readable storage medium, media, and/or memory. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage media 22 is a temporary memory. As used herein, a temporary memory refers to a memory having a primary purpose that is not long-term storage. Storage media 22, in some examples, is described as volatile memory. As used herein, a volatile memory refers to a memory that that the memory does not maintain stored contents when power to storage media 22 is turned off. Examples of volatile memories can include random access memories (RAM), dynamic random access memories (DRAM), static random access memories (SRAM), and other forms of volatile memories. In some examples, the storage media/memory is used to store program instructions for execution by the processor. The memory, in one example, is used by software or applications running on system 10 to temporarily store information during program execution.

Storage media 22 can be configured to store larger amounts of information than volatile memory. Storage media 22 can further be configured for long-term storage of information. In some examples, storage media 22 includes non-volatile storage elements. Examples of such non-volatile storage elements can include, for example, magnetic hard discs, optical discs, floppy discs, flash memories, cloud storage media, or forms of electrically programmable memories (EPROM) or electrically erasable and programmable (EEPROM) memories. Additionally, storage media 22 can be digital/electronic storage in the "cloud" that is distant from the other components of project staffing system 10.

System 10 can also include user interface 24. User interface 24 can be an input and/or output device and enables an operator/user to control operation, modification, view of data, etc. of information 28, ENCGD 32, interface description database 36, DNCGD 40, graphs 44 and/or 46 output 60, and/or the other systems/components within system 10 and/or in communication with system 10. For example, user interface 24 can be configured to receive inputs, such as information 28, from a user and/or provide outputs 60. User interface 24 can include one or more of a sound card, a video graphics card, a speaker, a display device (e.g., a liquid crystal display (LCD), a light emitting diode (LED) display, an organic light emitting diode (OLED) display, etc.), a touchscreen, a keyboard, a mouse, a joystick, and/or other type of device for facilitating input and/or output of information in a form understandable to users and/or machines. In one example, a user, operator, and/or other individual can use user interface 24 to view and/or manipulate information 28, ENCGD 32, interface description database 36, DNCGD 40, graphs 44 and/or 46, and/or output 60.

System 10 can include and/or work in conjunction with ENCGD generation module 30. ENCGD generation module 30 can include and/or function in conjunction with any of the other components of system 10 (such as processor 20, storage media 22, and/or user interface 24). ENCGD generation module 30 can access, receive, and/or otherwise use information 28 and/or other information regarding network 12. ENCGD generation module 30 can be configured to formulate/generate existing network configuration graph database (ENCGD) 32, which is a graph database that includes information representative of one, multiple, or all devices 14 of network 12 with the information potentially being a portion of and/or all network device, connectivity, and interface description information 28. ENCGD generation module 30 can be configured to formulate/generate ENCGD 32 in a format that provides for the generation of interface description database 36, DNCGD 40, and/or graphs 44 and/or 46 therefrom and/or is usable by LLM 50. In one example, the format of ENCGD 32 can be a usual format for a graph database that is known to one of skill in the industry and is acceptable by programs, systems, etc. familiar with accepting/accessing information in a graph database (such as DNCGD generation module 42, interface description database generation module 34, and/or LLM 50). One, multiple, or every device 14 of network 12 can be represented in ENCGD 32 with any associated information, such as a type of device, a device availability, a device state, a pool name, an IP address, and/or an interface description (as listed in network 12, whether correct or incorrect). ENCGD 32 can be updated/regenerated by ENCGD generation module 30 periodically and/or continuously as new/updated information 28 is received. Additionally, ENCGD 32 can be provided to any location, system, user, etc. for use/assistance, for example, in migrating network 12 to a network host. In this example, ENCGD 32 would be very useful in helping the IT professional/technician understand the network 12 (e.g., the devices 14 having names and/or types 16A, connections 16B, interface descriptions 16C and/or other device information 16D) and its characteristics and/or properties.

ENCGD generation module 30 can be configured to manually generate ENCGD 32 as performed and/or initiated by a user, and/or ENCGD generation module 30 can be configured to automatically generate (and/or initiate the generation of) ENCGD 32 in response to, for example, the reception of information 28 and/or in response to any other prompt/triggering event/instructions. ENCGD generation module 30 can save/store ENCGD 32 at any location and/or be configured to provide/communicate ENCGD 32 to any component within and/or distinct from system 10. In one example, ENCGD 32 is saved in storage media 22 for access/use by interface description database generation module 34, DNCGD generation module 38, graph generation module 42, prompt module 48, and/or LLM 50. In another example, ENCGD 32 is communicated to a user at a separate and distinct location from system 10. ENCGD generation module 30 can be, for example, a software program that generates ENCGD 32, other graph databases, and/or other electronic files in any desired format.

System can include and/or work in conjunction with interface description database generation module 34. Interface description database generation module 34 can include and/or function in conjunction with any of the other components of system 10 (such as processor 20, storage media 22, and/or user interface 24). Interface description database generation module 34 can access, receive, and/or otherwise use network 12, information 28, and/or ENCGD 32 to determine whether each interface description 16C as set out for each device 14 of network 12 correctly describes the actual state of the corresponding device 14 and/or other information about the device 14, such as connections 16B. Interface description database generation module 34 can determine whether each interface description 16C is correct by comparing each interface description 16C to the actual state of the corresponding device 14 on network 12. In response to at least one interface description 16C incorrectly describing the actual state of the corresponding device 14 or the connections 16B (and/or other incorrect device information 16D), interface description generation module 34 can generate interface description database 36. Interface description database 36 can have an entry for each incorrect interface description 16C that includes a name and/or type 16A of the device 14 (and/or another device 14 identifier), the incorrect interface description 16C, and a correct interface description that properly describes the characteristics and/or properties of the corresponding device 14 of network 12. Interface description database 36 can have any other information that can, for example, associate the correct interface description with the corresponding device 14. Interface description database 36 can organize the information in any format, including in a spreadsheet with multiple columns and/or rows that provide information regarding devices 14, device names and/or types 16A, connections 16B, incorrect interface descriptions 16C, and/or correct interface descriptions. In another example, interface description database 36 can be in the format of a graph database.

Interface description database generation module 34 can be configured to allow for a user to manually enter one, multiple, or all correct interface descriptions corresponding to devices 14. This can be performed via user interface 24, which can allow for the user to generated and/or enter the correct interface descriptions into entries set out in interface description database 36. Additionally and/or alternatively, interface description database generation module 34 can be configured to automatically generate the correct interface descriptions and entry those correct interface descriptions in interface description database 36 (as well as, when needed, generate the entirety of interface description database 36 to which the correct interface descriptions are entered). Interface description database generation module 34 can automatically generate interface description database 36, entries in interface description database 36, and/or the correct interface descriptions for corresponding devices 14 of network 12 by, for example, reviewing information 28 and ENCGD 32, which both can include information about the actual state of devices 14 on network 12. Interface description database generation module 34 can compare the actual state of devices 14, as set out in information 28 and/or ENCGD 32, to interface descriptions 16C as stated in information 28 and/or ENCGD 32. If the interface descriptions 16C do not accurately represent the actual state of devices 14, interface description database generation module 34 can generate a new, accurate and correct interface description for the respective device 14 that can include information that correctly represents the characteristics, properties, state, etc. of the device 14, such as the correct device name and/or type, the correct connections of device 14 to other devices, and/or correct other information.

Additionally and/or alternatively, interface description database generation module 34 can automatically generate additional entries in interface description database 36 for additional devices 14 that have similar incorrect interface descriptions as previously generated entries and corresponding interface descriptions. For example, interface description database generation module 34 can generate (via manual and/or automatic formulation) a first entry in interface description database 36 corresponding to a first correct interface description for a first device 14 that corrects the name of a device that first device 14 is connected to, and interface description database generation module 34 can automatically generate a second entry in interface description database 36 corresponding to a second correct interface description for a second device 14 that corrects the name of that same device that the second device 14 is connected to. This type of automatic entry generation can be performed for all devices 14 that have interface descriptions that incorrectly name that same device. In other examples/configurations, interface description database generation module 34 can automatically generate other entries having other information. Interface description database 36 can be updated/regenerated by interface description database generation module 34 periodically and/or continuously as new/updated information 28 and/or a new/updated ENCGD 32 is received/accessed.

Interface description database generation module 34 can be configured to manually generate interface description database 36 as initiated (and/or performed) by a user, and/or interface description database generation module 34 can be configured to automatically generate (and/or initiated the generation of) interface description database 36 (or an entry and/or correct interface description) in response to, for example, the reception of information 28 and/or ENCGD 32 and/or in response to any other prompt/triggering event/instructions. Additionally, interface description database generation module 34 can save/store interface description database 36 at any location and/or be configured to provide/communicate interface description database 36 to any component within and/or distinct from system 10. In one example, interface description database 36 is saved in storage media 22 for access/use by DNCGD generation module 38, graph generation module 42, prompt module 48, and/or LLM 50. In another example, interface description database 36 is communicated to a user at a separate and distinct location from system 10. Interface description database generation module 34 can be, for example, a software program that generates interface description database 36, other databases, and/or other electronic files in any desired format.

Interface description database 36 can have a variety of uses and/or functions. In one example, interface description database 36 can be used by an IT professional/technician as a list/"road map" that includes all incorrect interface descriptions 16C in the actual network 12 as well as the correct interface descriptions. Thus, when an IT professional aims to correct those errors in the actual network 12, the IT professional can use interface description database 36 to know which interface descriptions 16C of devices 14 need to be analyzed and the proper, correct interface description to enter/use with that device 14.

Often times, interface descriptions 16C can be used by IT professionals/technicians to understand how devices 14 of network 12 interact. However, when those interface descriptions 16C are incorrect, the analysis as to why the device 14 may be malfunctioning is faulty because it is based upon at least one incorrect interface description 16C. Thus, it may be important to correct those interface descriptions 16C both in the graph databases (e.g., DNCGD 40) as well as in the actual network 12.

System 10 can include and/or work in conjunction with DNCGD generation module 38. DNCGD generation module 38 can include and/or function in conjunction with any of the other components of system 10 (such as processor 20, storage media 22, and/or user interface 24). Additionally, DNCGD generation module 38 can be similar to and/or the same component/system as ENCGD generation module 30 such that the functions and/or capabilities of DNCGD generation module 38 and ENCGD generation module 30 are the same. In such a configuration, system 10 can include only one of ENCGD generation module 30 and DNCGD generation module 38. Thus, DNCGD generation module 38 can have any and/or all of the capabilities and/or configurations as described above with regards to ENCGD generation module 30.

However, DNCGD generation module 38 can have alternate and/or additional capabilities. For example, DNCGD generation module 38 can receive, access, and/or otherwise use ENCGD 32 and/or interface description database 36 to generate/formulate DNCGD 40 that includes information 28 and corrected interface descriptions that properly describe the characteristics, properties, and/or actual state of the corresponding devices 14 of network 12. The corrected interface descriptions are set out in interface description database 36. DNCGD 40, as generated by DNCGD generation module 38, can be a graph database that includes information representative of one, multiple, or all devices 14 of network 12 as those devices 14 are in their actual state (e.g., representative of the multiple devices 14, the interconnectivity of the multiple devices (i.e., connections 16B), and/or the correct interface description for each device 14). DNCGD generation module 38 can be configured to formulate/generate DNCGD 40 in a format that provides for the generation of graph 46 therefrom and/or in a format that is useable by LLM 50. In one example, the format of DNCGD 40 can be a usual format for a graph database that is known to one of skill in the industry and is acceptable by programs, systems, etc. familiar with accepting/accessing information in a graph database (such as graph generation module 42 and/or LLM 50). One, multiple, or every device 14 of network 12 can be represented in DNCGD 40 with any associated information (with at least a portion of that information correctly identifying the state of the corresponding device 14 and/or network 12), such as those set out with regards to ENCGD 32 described above. DNCGD 40 can be updated/regenerated by DNCGD generation module 38 periodically and/or continuously as new/updated information is provided, received, accessed, etc. by DNCGD 40, such as new/updated information 28, ENCGD 32, interface description database 36, and/or other information. As with ENCGD 32, DNCGD 40 can be provided to any location, system, user, etc. for use/assistance, for example, in migrating network 12 to a network host. In this example, DNCGD 40 would be very useful in helping the IT professional/technician understand the network 12 and its characteristics, properties, and/or actual state.

DNCGD generation module 38 can be configured to manually generate DNCGD 40 as performed and/or initiated by a user, and/or DNCGD generation module 30 can be configured to automatically generate (and/or initiated the generation of) DNCGD 40 in response to, for example, the reception/accessing of ENCGD 32 and interface description database 36 and/or in response to any other prompt/triggering event/instructions. DNCGD generation module 38 can save/store DNCGD 40 at any location and/or be configured to provide/communicate DNCGD 40 to any component within and/or distinct from system 10. In one example, DNCGD 40 is saved in storage media 22 for access/use by graph generation module 42, prompt module 48, and/or LLM 50. In another example, DNCGD 40 is communicated to a user at a separate and distinct location from system 10. DNCGD generation module 38 can be, for example, a software program that generates DNCGD 40, other graph databases, and/or other electronic files in any desired format.

System 10 can include and/or work in conjunction with graph generation module 42. Graph generation module 42 can include and/or function in conjunction with any of the other components of system 10 (such as processor 20, storage media 22, and/or user interface 24). Graph generation module 42 can be configured to generate existing network configuration graph 44 to display and/or allow for manipulation and/or review of information regarding ENCGD 32. Additionally and/or alternatively, graph generation module 42 can be configured to generate desired network configuration graph 46 to display and/or allow for manipulation and/or review of information regarding DNCGD 40.

Graph generation module 42 can configure each of graphs 44 and/or 46 to have nodes and edges with each node being representative of one device 14 of network 12 (as set out in ENCGD 32 and/or DNCGD 40) and each edge between respective nodes being representative of connections 16B between devices 14. The nodes and/or edges can also include other information, such as device names and/or types 16A, interface descriptions 16C (and/or correct/accurate interface descriptions), and/or other device information 16D. In existing network configuration graph 44, which is dependent upon ENCGD 32, the interface descriptions as set out in the graph 44 are interface descriptions 16C as they appear in network 12 (so thus can incorrectly describe the actual state of the corresponding devices 14). In desired network configuration graph 46, which is dependent upon DNCGD 40, the interface descriptions as set out in graph 46 are the correct interface descriptions as determined by/with the assistance of interface description database generation module 34 and as set out in interface description database 36 (e.g., as set out in DNCGD 40). Graphs 44 and/or 46 can be displayed, altered, and/or manipulated (e.g., interacted with) via user interface 24. Graphs 44 and/or 46 can have any configuration and can, for example, include layers that show different information as desired, including network layers 1, 2, and/or 3.

Figure 3:
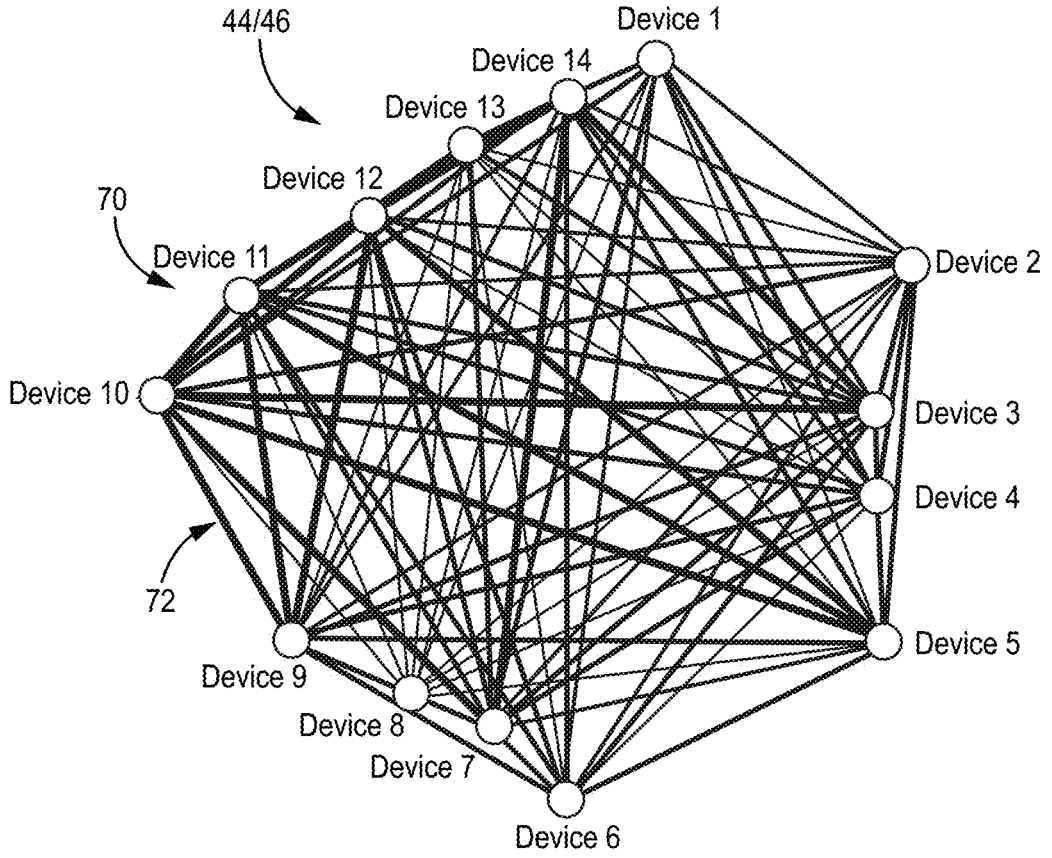
FIG. 3 is an example graph to simulate/map a network.

An example of existing network configuration graph 44 and/or desired network configuration graph 46 is shown in FIG. 3 with the nodes 70 being representative of devices 14 and the edges 72 being representative of connections 16B between the nodes 70/devices 14. Graphs 44/46 can simulate/map network 12 such that the interactivity with graphs 44/46 provide insight as to the configuration, orientation, etc. of network 12. Graphs 44/46 shown in FIG. 3 can include, display, and/or otherwise provide for interactivity with any other additional information of network 12 (in addition to devices 14 and connections 16B), including device names and/or types, a device availability, a device state, a pool name, an IP address, an interface description, and/or other information. This additional information can be associated with each corresponding node 70 and/or edge 72.

In the example graph 44/46 shown in FIG. 3, the example devices 1 through 14 are shown as nodes 70 with the devices 1 through 14 having interconnectivities (e.g., connections 16B) shown as edges 72. Graphs 44 and/or 46 can have any orientations, configurations, functionalities, etc. useful for displaying information regarding network 12. While only one layer and only a portion of network 12 are shown in graph 44/46 in FIG. 3, graphs 44 and/46 can show information corresponding to the entirety of network 12 and/or can show multiple layers having differing information.

Each of graphs 44 and/or 46 can include and/or display a portion of or all of the information regarding ENCGD 32 and DNCGD 40, respectively. For example, graph 44 can display one or a limited number of devices 14 (and additional/associated information) as well as the connections 16B between those devices 14. Graphs 44 and/or 46 can be interactive to allow for a user to select/deselect desired information (e.g., nodes and/or edges) so as to display/undisplay that information. Graphs 44 and/or 46 can be displayed using any user interface, software program, electronic file format, LLM, etc. In another example, graphs 44 and/or 46 are not interactive and instead simply display information in an informative format. The information in graphs 44 and/or 46 can be displayed in layers dependent upon the information. For example, one layer could display only the nodes of a particular device type, such as only the devices 14 that are routers.

Graph generation module 42 can generate graphs 44 and/or 46 having any configuration, orientation, size, type, etc. as is useful, desired, and/or necessary for a user and/or others to view and/or understand ENCGD 32 and/or DNCGD 40. Graph generation module 42 can be configured to manually generate graphs 44 and/or 46 as performed and/or initiated by a user, and/or graph generation module 42 can be configured to automatically generate (and/or initiate the generation of) graphs 44 and/or 46 in response to, for example, the generation of one, multiple, or all of ENCGD 32, interface description database 36, and/or DNCGD 40. Additionally and/or alternatively, graph generation module 42 can be configured to automatically generate graphs 44 and/or 46 in response to any other prompt/triggering event/instructions. Graph generation module 42 can save/store graphs 44 and/or 46 at any location and/or be configured to provide/communicate graphs 44 and/or 46 to any component within and/or distinct from system 10. In one example, graphs 44 and/or 46 are saved in storage media 22 for access/use by user interface 24, prompt module 48, and/or LLM 50. In another example, graphs 44 and/or 46 are provided to an endpoint of a gateway and accessible by any components/systems subscribing to the endpoint.

System 10 can include and/or work in conjunction with prompt module 48 and/or LLM 50. Prompt module 48 and/or LLM 50 can include and/or function in conjunction with any of the other components of system 10 (such as processor 20, storage media 22, and/or user interface 24). Prompt module 48 and/or LLM 50 can work together to determine, for example, output(s) 60. Additionally and/or alternatively, prompt module 48 and/or LLM 50 can generate, for example, ENCGD 32, interface description database 36, DNCGD 40, graphs 44 and/or 46, and/or any other information. In one configuration, LLM 50 performs the functions of one, multiple, or all of ENCGD generation module 30, interface description database generation module 34, DNCGD generation module 36, and/or graph generation module 42 such that system 10 may not include one, multiple, or all of these components. System 10 can receive information from and/or provide information to LLM 50, and while shown in FIG. 1 as being within system 10 (e.g., a component of system 10), LLM 50 can be a separate and distinct component/system from system 10 and/or from any of the components of system 10.

Prompt module 48 can be configured to prompt/request LLM 50 to perform various specified tasks. Prompt module 48 can generate prompts that request LLM 50 to, for example: 1) determine at least one output 60 regarding network 12; 2) formulate ENCGD 32 from network device, connectivity, and interface description information 28; 3) formulate interface description database 36 from network device, connectivity, and interface description information 28 and/or ENCGD 32; 4) formulate DNCGD 40 from network device, connectivity, and interface description information 28, ENCGD 32, and/or interface description database 36; 5) generate existing network configuration graph 44 from ENCGD 32 and/or other information; and/or 6) generate desired network configuration graph 46. Prompt module 48 can be configured to provide and/or otherwise allow access to LLM 50 other information useful and/or necessary for LLM 50 to perform the prompted tasks and/or instructions. Prompt module 48 can be configured to prompt/request LLM 50 to perform other tasks and/or generate other outputs not expressly disclosed herein. Further, the prompt to LLM 50 as generated, compiled, and/or otherwise used by prompt module 48 can include other information, such as example descriptions that provide guidance as to content, layout, etc. of the outputs 60; databases 32, 36, and/or 38; and/or graphs 44 and/or 46. The prompt to LLM 50 as generated, compiled, etc. by prompt module 48 can include other information, request LLM 50 to perform other determinations, and/or request LLM 50 to make those determinations in a variety of different ways/processes. The request to LLM 50 by prompt module 48 can be a simple request/prompt that can include only one question/query/inquiry or can be a complex/compound request/prompt that can include/request a series of separate steps/tasks performed sequentially, concurrently, and/or in another fashion to return desired results. Prompt module 48 can be configured to generate and/or include any information, requests, etc. in the one and/or multiple prompts to LLM 50. In one example, each prompt to LLM 50 is newly generated by prompt module 48 while in another example, a portion and/or all of a prior prompt is reused to generate a subsequent prompt to LLM 50.

Prompt module 48 can be configured to generate, compile, etc. one and/or multiple prompts for LLM 50 manually as initiated and/or generated by a user, and/or prompt module 48 can be configured to automatically generate/compile one or multiple prompts for LLM 50 in response to, for example, the reception of and/or access to network device, connectivity, and interface description information 28. Additionally and/or alternatively, prompt module 48 can be configured to automatically generate prompt(s) in response to any other triggering events/instructions. The generation of one or multiple prompts 50 can be periodic and/or continuous as initiated by, for example, the reception/access to new and/or modified network device, connectivity, and interface description information 28, ENCGD 32, interface description database 36, DNCGD 50, graph 44, and/or graph 46. The prompts as generated by prompt module 48 can be saved at any location (e.g., storage media 22) and/or immediately and/or quickly be provided/sent to LLM 50 for execution by LLM 50.

System 10 can include and/or work in conjunction with, receive information from, and/or provide information to one or multiple LLMs 50. In one configuration, LLM 50 is a separate and distinct component/system from system 10, and LLM 50 accesses and/or otherwise receives information (e.g., prompts and/or other information, databases, graphs, etc.) from system 10 via, for example, the internet. In another configuration, shown in FIG. 1 as an example system 10, LLM 50 can be within (e.g., a component of) and/or work in conjunction with system 10.

LLM 50 and similar models are increasingly common deep learning algorithms that can recognize, summarize, describe, translate, predict, and/or generate content using large datasets, which can include information available and/or accessed on the internet. LLM 50 can be used to process simple or complex requests which, for example, demand retrieval of data from multiple or specialized sources, assemble outputs (e.g., natural language, computer code, lists, graphs, and/or databases) from the retrieved data based on identified criteria, and/or further process of those outputs (e.g., transmission or archival to specified categories or locations and/or recipients). LLM 50 can include a generalized LLM, specialized LLM, and/or other models. LLM 50 can be one or multiple models and/or other systems known to one of skill in the industry for retrieving, organizing, summarizing, manipulating, and/or performing other functions with regards to information in response to one or multiple requests from, for example, prompt module 48. LLM 50 can be configured to communicate with (e.g., provide information to and receive information from) any of the components of system 10 and/or other components, such as network 12, network discovery module 26, and/or any other components.

In response to one or multiple prompts from prompt module 48 (and the reception of and/or access to information, such as network device, connectivity, and interface description information 28 and/or other information, databases, and/or graphs), LLM 50 can be configured to, for example: 1) determine at least one output 60 regarding network 12; 2) formulate ENCGD 32 from network device, connectivity, and interface description information 28; 3) formulate interface description database 36 from network device, connectivity, and interface description information 28 and/or ENCGD 32; 4) formulate DNCGD 40 from network device, connectivity, and interface description information 28, ENCGD 32, and/or interface description database 36; 5) generate existing network configuration graph 44 from ENCGD 32 and/or other information; and/or 6) generate desired network configuration graph 46. The at least one output 60 as determined by LLM 50 can be any information dependent on network 12.

In one example, output 60 is an explanation as to why device(s) failed to connect 62 as requested in a prompt generated by prompt module 48. The prompt that results in the explanation why device(s) failed to connect 62 can include additional information regarding network 12, such as some or all of network device, connectivity, and interface description information 28, ENCGD 32, interface description database 36, DNCGD 50, graphs 44 and/or 46, and/or other information. In this or another example, only the information, portions of databases, portions of graphs, etc. relevant to the failed device 14 may be accessed/provided in the prompt to illicit the explanation 62 by LLM 50.

In another example, output 60 is the network response(s) to outage(s) 64 as requested by in a prompt generated by prompt module 48. Such a prompt can include any information, such as DNCGD 40, and a request that sets up a simulated outage (e.g., devices 23 through 156 have stopped working due to a power outage). The prompt can also include a request asking LLM 50 to, for example, generate an altered DNCGD 40 that reflects the state of network 12 (as simulated in DNCGD 40) if the outage occurred. Additionally and/or alternatively, the prompt can include a request asking for an altered desired network configuration graph 46 that reflects the state of network 12 (as simulated in DNCGD 40 and/or graph 46).

In a third example, output 60 is the formulated databases and/or graphs 66. Prompt module 48 can generate the prompt(s) and LLM 50 can determine/formulate one, multiple, or all of ENCGD 32, interface description database 36, DNCGD 40, existing network configuration graph 44, and/or desired network configuration graph 46. These databases and/or graphs can be generated by LLM 50 through the use of any information regarding network 12, such as network device, connectivity, and interface description information 28; databases 32, 36, and/or 40; and/or graphs 44 and/or 46.

LLM 50 can determine other outputs 60 not expressly disclosed herein regarding network 12 in response to any prompt(s). LLM 50 along with databases 32, 36, and/or 40 and/or graphs 44 and/or 46 can be used to determine any information about network 12 and/or simulate any events with the potential of influencing network 12.

LLM 50 can be configured to generate databases 32, 36, and/or 40 and/or graphs 44 and/or 46 and/or determine output(s) 60 (e.g., output(s) 62, 64, and/or 66) manually as performed and/or initiated by a user, and/or LLM 50 can be configured to automatically determine output(s) 60 in response to, for example, the reception of one or multiple prompts from prompt module 48. Additionally and/or alternatively, LLM 50 can be configured to automatically determine (and/or initiate the determination of) output(s) 60 in response to any other triggering events/instructions. The activity by LLM 50 can be periodic and/or continuous as initiated by, for example, the access to/reception of one or multiple prompts. Output(s) 60 can be saved at any location and/or immediately and/or quickly be provided/sent to any location and/or user.

Output(s) 60, during and/or after being generated by LLM 50, can be communicated to a variety of locations, components, and/or systems. In one example, one, multiple, or all output(s) 60 are communicated to (i.e., provided to and/or accessed by) storage media 22 associated with system 10. In one example, one, multiple, or all output(s) 60 are communicated to a user within system 10 and/or distant from system 10. In another example, one, multiple, or all output (s) 60 can be communicated to another large language model that can review/analyze output(s) 60 and determine further inferences. Additionally and/or alternatively, output(s) 60 can be provided to/accessed by one, multiple, or all of these components/locations. Output(s) 60 can be communicated/provided in real time as each output 60 is generated. In another example, output(s) 60 can be provided after all output(s) 60 (e.g., after all databases and/or graphs) are generated and assembled/compiled into one document, file, etc. In a third example, output(s) 60 can be provided to an endpoint on a gateway, and the output(s) 60 can be accessible to any users, systems, programs, etc. that subscribe to the endpoint.

FIG. 2 is a method flow chart describing an example process 100 for formulating a desired network configuration graph database and/or graphs that can simulate/map the network, among other elements and/or steps as described below. While process 100 is described herein as being used with regards to graph database formulation system 10, process 100 can be performed by any system having any components, capabilities, configurations, and/or functionalities suitable for performing process 100. Additionally, process 100 can include other steps not expressly disclosed herein and/or can include performing the disclosed steps in any order and/or multiple times as is desired and/or necessary to generate databases 32, 36, and/or 40 and/or graphs 44 and/or 46 as well as determine output(s) 60. Moreover, not all steps of process 100 must be performed, and process 100 can be performed partially and/or entirely in a digital environment by and/or within the systems/components set out in FIG. 1, such as graph database formulation system 10 and/or other systems/components.

Process 100 can include step 102, which is to perform network discovery on network 12. Step 102 can be performed by network discovery module 26 and/or any other components, such as a component of system 10. The performance of step 102 can result in the discovery and/or generation of network device, connectivity, and interface description information 28 (associated with network 12), which can be in any format, including in an electronic file, a physical file, a database, and/or other formats/configurations. Step 102 can be performed on network 12 once, periodically, and/or continuously as desired/needed to discover/generate information 28 and/or any other information/data associated with network 12. In one example, step 102 is performed continuously and information 28 is updated as network 12 changes. In another example, only the changes to network 12 are updated/altered in information 28 after the performance of step 102. Step 102 (i.e., network discovery) can be performed using one or multiple of a variety of software programs, physical analyses, and/or processes. For example, network discovery of network 12 in step 102 can be performed via any methods known to one of skill in the industry. Step 102 can be performed manually as initiated by, for example, a user and/or software program, and/or step 102 can be perform automatically in response to any instruction, event, etc. As described above, process 100 can include performing step 102 any number of times before, during, and/or after any of the other steps set out in process 100. Additionally and/or alternatively, process 100 can include a configuration in which step 102 is not performed and device, connectivity, and interface description information 28 (and/or other information associated with network 12) is provided and/or otherwise accessed by system 10 for the performance of other steps of process 100. In one example, information 28, as periodically and/or continuously discovered via step 102, can be provided to an endpoint on a gateway and is accessible by any components, systems, etc. that subscribe to the endpoint.

Process 100 can include step 104, which is accessing and/or otherwise receiving network information, such as device, connectivity, and interface description information 28. As described above, information 28 can be discovered/generated in step 102. In another configuration, information 28 is provided via another source and/or process. Information 28 can be received by system 10 from, for example, network discovery module 26 and/or can be provided by network discovery module 26 for access by, for example, system 10. Additionally and/or alternatively, information 28 can be saved in, for example, storage media 22 and accessed by the necessary components of system 10. Step 104 can be performed and/or initiated manually by a user and/or automatically in response to any instructions, events, etc., such as in response to the performance of step 102 to discover/generate information 28 and/or to update information 28.

Process 100 can include step 106, which is generating ENCGD 32. Step 106 can be, for example, performed by ENCGD generation module 30, LLM 50, and/or any other component(s) of system 10. Step 106 can be performed using device, connectivity, and interface description information 28 associated with network 12, and step 106 can generate ENCGD 32 that is a graph database that includes information representative of one, multiple, or all devices 14 of network 12. ENCGD 32 as generated in step 106 can be in a format that provides for the subsequent generation of DNCGD 40, graph 44, and/or graph 46 and/or that provides for use by LLM 50. In one example, the format of ENCGD 32 as generated in step 106 can be in a usual format for a graph database that is known to one of skill in the industry and is acceptable by programs, systems, etc. familiar with accepting/accessing information in a graph database. ENCGD 32, as generated in step 106, can have any configuration, characteristics, properties, etc. as described above with regards to ENCGD generation module 30 and ENCGD 32. Step 106 can be performed and/or initiated manually by a user and/or automatically in response to any instructions, events, etc., such as in response to accessing/receiving information 28 (in step 104). Step 106 can be performed once, periodically, and/or continuously as updated information 28 is accessed/received to update ENCGD 32. Additionally and/or alternatively, step 106 can include saving ENCGD 32 to any location, such as storage media 22, providing ENCGD 32 to a location distant from system 10, and/or allowing access and/or otherwise providing ENCGD 32 to a user, among other capabilities.

Process 100 can include step 108, which is determining if one or multiple interface descriptions 16C correctly describe the actual state of the corresponding device 14 and/or other information about the device 14, such as device name and/or type 16A, connections 16B, and/or other device information 16D. Step 108 can be performed by and/or with assistance from interface description database generation module 34 and/or LLM 50. The comparison in step 108 can be a comparison of interface description 16C as set out in network device, connectivity, and interface description information 28 (and potentially as represented in ENCGD 32) to the actual state of device 14 in network 12, which is set out in information 28. For example, interface description 16C for device 1 can state that device 1 is a router that is connected to devices 37 though 154. However, as set out in information 28, device 1 is in actuality a modem that is connected to devices 37-51 and 98-106. Thus, the performance of step 108 would reveal that interface description 16C as associated with device 1 in network 12 incorrectly describes the actual state of device 1. Step 108 can be performed for one, multiple, or all devices 14/interface descriptions 16C in network 12 and/or set out in network device, connectivity, and interface description information 28. The performance of step 108 for multiple devices/interface descriptions 16C can be in series and/or concurrently, and/or step 108 can be performed at any time during process 100. Step 108 can include denoting and/or otherwise saving the incorrect interface descriptions 16C corresponding to devices 14.

Process 100 can include step 110, which is, in response to step 108 determining that an interface description 16C is incorrect (i.e., at least one interface description 16C incorrectly describing the actual state of the corresponding device 14 or the connections 16B and/or other incorrect device information 16D), entering a correct interface description in interface description database 36. Step 110 can include, if needed, creating/generating interface description database 36 if step 110 is performed for the first time with respect to network 12. Step 110 can be performed by and/or with assistance from interface description database generation module 34 and/or LLM 50. Interface description database 36, as generated and/or otherwise added to in step 110 (e.g., the creation of a new entry), can have one or multiple entries for each incorrect interface description 16C that includes a name and/or type 16A of device 14, the incorrect interface description 16C, and/or a correct interface description that properly describes the characteristics and/or properties of the corresponding device 14 of network 12. Step 110 can organize the information in interface description database 36 in any format, including in a spreadsheet with multiple columns that provide information regarding devices 14, device names and/or types 16A, connections 16B, incorrect interface descriptions 16C, and/or correct interface descriptions. In another example, interface description database 36 can be in the format of a graph database (or another database type) and/or, as generated in step 106, any configuration, characteristics, properties, etc. as described above with regards to interface description database generation module 34 and/or interface description database 36. Step 110 can be performed and/or initiated manually by a user and/or automatically in response to any instructions, events, etc., such as in response to accessing/receiving interface description(s) 16C and/or information 28. Step 110 can be performed once, periodically, and/or continuously for one, multiple, or all devices 14/interface descriptions 16C as updated information 28 is accessed/received. Additionally and/or alternatively, step 110 can include saving interface description database 36 to any location, such as storage media 22, providing interface description database 36 to a location distant from system 10, and/or allowing access and/or otherwise providing interface description database 36 to a user, among other capabilities.

Process 100 can also include step 112, which is automatically generating additional entries in interface description database 36 having similar incorrect interface descriptions as previously generated entries and corresponding interface descriptions. Step 112 can be performed in a similar manner and by the same or different components than those described with regards to step 110. Step 112 can be performed by and/or with assistance from interface description database generation module 34 and/or LLM 50. For example, step 110 can include generating a first entry in interface description database 36 corresponding to a first correct interface description for a first device 14 that corrects the name of a device that first device 14 is connected to, and step 112 can include automatically generating a second entry in interface description database 36 corresponding to a second correct interface description for a second device 14 that corrects the name of that same device that the second device 14 is connected to. Step 112, which automatically generates entries in interface description database 36, can be performed for all devices 14 that have interface descriptions that incorrectly name that same device (thus, the incorrect name of that device can be corrected for all interface descriptions for all devices 14). Step 112, in other examples/configurations, can automatically generate other entries having other information. Step 112 can be performed and/or initiated manually and/or automatically in response to any instructions, events, etc., such as the generation of an entry in step 110 for which other similar incorrect interface descriptions exist. Step 112 can be performed once, periodically, and/or continuously for one, multiple, or all devices 14/interface descriptions 16C, and can be performed as updated information 28 is accessed/received. The newly generated entries can have the same or a different format to previous entries, and the newly added to/modified interface description database 36 can be saved, provided to, and/or accessed by any components and/or users, among other capabilities (as described above with regards to step 110).

Process 100 can include step 114, which is providing ENCGD 32 and/or interface description database 36 to LLM 50. Process 100 as set out in FIG. 2 includes using LLM 50 to generate DNCGD 40 (as described with regards to step 116 below) and/or to generate graphs 44 and/or 46 (as described with regards to step 118 below), but other configurations of process 100 can include step 116 being performed by DNCGD generation module 38 and/or another component (so thus step 114 can be providing ENCGD 32 and/or interface description database 36 to DNCGD generation module 38) and/or can include step 118 being performed by graph generation module 42 and/or another component (so thus step 114 can be providing DNCGD 32 and/or interface description database 36 to graph generation module 42). Additionally and/or alternatively, step 114 can include allowing access to ENCGD 32 and/or interface description database 36 to LLM 50 and/or other components. Step 114 can include providing ENCGD 32 and/or interface description database 36 via any wired and/or wireless communication, including via the internet. In another configuration, ENCGD 32 and/or interface description database 36 can be provided to an endpoint and/or another destination to which LLM 50 and/or other components subscribe to access ENCGD 32 and/or interface description database 36. In another example, ENCGD 32 and/or interface description database 36 are provided to prompt module 48, which in turn provides ENCGD 32 and/or interface description database 36 to LLM 50 along with one and/or multiple prompts. In a third example, ENCGD 32 and/or interface description database 36 are saved in storage media 22 and then accessed from there by LLM 50 and/or other components. Step 114 can be performed and/or initiated manually by a user and/or automatically in response to any instructions, events, etc., such as in response to the collection/generation of one, multiple, or all of information 28, ENCGD 32, and/or interface description database 36. Step 114 can be performed once, periodically, and/or continuously as ENCGD 32 and/or interface description database 36 are updated based upon, for example, changes to network 12.

Process 100 can further include step 116, which is formulating/generating desired network configuration graph database (DNCGD) 40. Step 116 can be performed by LLM 50, DNCGD generation module 38, and/or any other components of system 10 (and/or by another system). The configuration of step 116 that is performed by LLM 50 can also include generating a prompt by, for example, prompt module 48 that instructs/requests LLM 50 to formulate/generate DNCGD 40. The configuration of step 116 that is performed by DNCGD generation module 38 can include generating, accessing, and/or otherwise providing instructions (such as computer software code and/or other instructions) to DNCGD generation module 38 to formulate/generate DNCGD 40. The prompt/instructions are described above with regards to prompt module 48 and/or DNCGD generation module 38.

Step 116 can formulate/generate one or multiple DNCGDs 40 that include and/or represent one, multiple, or all devices 14 (with characteristics 16A, 16B, 16D, and correct description interfaces from interface description database 36) of network 12. In one example, step 116 generates DNCGD 40 that includes only a portion of the devices 14 of network 12. In another example, step 116 generates DNCGD 40 that includes all devices (with characteristics 16A, 16B, 16D, and correct description interfaces from interface description database 36) of network 12. DNCGD 40 can be generated/formulated in step 116 so as to be in any format, as discussed above with regards to DNCGD 40. Additionally and/or alternatively, DNCGD 40, after being generated in step 116, can be saved to and/or provided to/accessed by any location and/or user, such as storage media 22 and/or an endpoint to which users/components can subscribe. Step 116 can be performed before, during, and/or after any of the other steps of process 100. For example, step 116 can be performed concurrently with one and/or multiple of steps 106, 108, 110, 112, 114, 118, and/or 120. Step 116 can be performed and/or initiated manually by a user and/or automatically in response to any instructions, events, etc., such as in response to the reception of ENCGD 32 and/or interface description database 36 by LLM 50, DNCGD generation module 38, and/or other components performing step 116. In one example, system 10 provides ENCGD 32 and interface description database 36 to LLM 50 (along with a prompt) automatically once those databases (and the prompt) are generated, and LLM 50 is automatically instructed to generate DNCGD 40. Moreover, step 116 can be performed once, periodically, and/or continuously as the information provided in step 114 is updated based upon, for example, changes to network 12.

Process 100 can also include step 118, which is generating/formulating one and/or multiple graphs 44 and/or 46 representative of network 12. Step 118 can be performed by LLM 50, graph generation module 42, and/or any of the other components of system 10 (and/or by another system). Similar to step 116, the configuration of step 118 that is performed by LLM 50 can also include generating a prompt by, for example, prompt module 48 that instructs/requests LLM 50 to formulate/generate graphs 44 and/or 46. The configuration of step 118 that is performed by graph generation module 42 can include generating, accessing, and/or otherwise providing instructions (such as computer software code and/or other instructions) to graph generation module 42 to formulate/generate graphs 44 and/or 46. The prompt/instructions are described above with regards to prompt module 48 and/or graph generation module 42. Additionally, Step 118 and/or step 116 can include providing DNCGD 40 to LLM 50, graph generation module 42, and/or other components for performing step 118. Graphs 44 and/or 46 as generated in step 118 are shown, for example, in FIG. 3.

Step 118 can formulate/generate one or multiple graphs 44 and/or 46 that include and/or represent one, multiple, or all devices 14 of network 12. In the case of existing network configuration graph 44, the information that may be represented in graph 44 can include interface description(s) 16C as stated in network 12 (whether correct or incorrect), while in the case of desired network configuration graph 46, the information that can be represented in graph 46 can include the correct interface description(s) as set out in interface description database 36 and as correctly describing the actual state of the corresponding device 14 of network 12. In one example, step 118 generates graphs 44 and/or 46 that include (e.g., shows/displays) only a portion of the devices 14 (and associated information) of network 12. In another example, step 118 generates graphs 44 and/or 46 that include (e.g., shows/displays) all devices (and associated information) of network 12. Graphs 44 and/or 46 can be generated/formulated in step 118 so as to have any format, layers, configurations, orientations, etc. (with one example of a graph structure shown in FIG. 3) and allow for a user to view and/or manipulate information as desired. In one configuration, graphs 44 and/or 46 can have layers that display different information within the same graph depending on the selected layer(s) and/or the selected information to view/manipulate. Thus, graphs 44 and/or 46 can be configured to function along with, for example, user interface 24.

Additionally and/or alternatively, graphs 44 and/or 46, after being generated in step 118, can be saved to and/or provided to/accessed by any location and/or user, such as storage media 22 and/or an endpoint to which users/components can subscribe. Step 118 can be performed before, during, and/or after any off the other steps of process 100. For example, step 118 can be performed concurrently with one and/or multiple steps 106, 108, 110, 112, 114, 116, and/or 120. Similarly, step 118 can be performed concurrently with the performance of another step 118 to generate another graph, such as step 118 being performed to generate graph 44 at the same time as being performed to generate graph 46. Step 118 can be performed and/or initiated manually by a user and/or automatically in response to any instructions, events, etc. In one example, step 118 is initiated/performed automatically to generate graph 44 in response to the reception of information 28 and/or ENCGD 32. In another example, step 118 is initiated/performed automatically to generate graph 46 in response to the reception of one or multiple of ENCGD 32, interface description database 36, and/or DNCGD 40. In a third example, system 10 provides DNCGD 40 to LLM 50 (along with a prompt) automatically once DNCGD 40 (and the prompt) is generated, and LLM 50 is automatically instructed to generate desired network configuration graph 46. Moreover, step 118 can be performed once, periodically, and/or continuously as the information of network 12 is updated (and thus ENCGD 32, interface description database 36, DNCGD 40, and/or other information is updated).

Process 100 can include step 120, which is determining, by LLM 50, output(s) 60 regarding network 12. Step 120 can include determining multiple outputs 60 concurrently and/or in series, and output(s) 60 as determined in step 120 can be any information dependent on network 12. such as an output 60 dependent upon DNCGD 40 (which in turn is dependent upon network 12). Step 120 can include generating and/or providing one or multiple prompts to LLM 50 requesting LLM 50 to determine output(s) 60. Additionally, step 120 can include generating and/or providing information to LLM 50 upon which output(s) 60 are based, such as information 28, ENCGD 32, interface description database 36, DNCGD 40, existing network configuration graph 44, and/or desired network configuration graph 46. The prompt(s) as potentially generated/provided in step 120 are discussed with regards to prompt module 48 above. LLM 50 can use any processes/methods for determining output(s) 60 in step 120, and the output(s) 60 can be any information.

In a first example, step 120 can determine output 60 that is an explanation as to why device(s) failed to connect 62. This determination can include analyzing information regarding the particular device(s) 14, such as information 16A-16D as well as the correct interface description as set out in interface description database 36. In a second example, step 120 can determine output 60 that is the network response to simulated outage(s) 64. This determination can include simulating the failure of one, multiple, and/or all devices 14 in network 12 as represented in databases 32/36 and/or graphs 44/46. In a third example, step 120 can determine output 60 that is the formulation of databases 32/36/40 and/or graphs 44/46 (denoted as output 66 in FIG. 1) as described above. These example determinations in step 120 can include other sub-steps, processes, methods, etc. as performed by LLM 50 and/or as prompted by prompt module 48. In another configuration, step 120 can be performed by one or multiple other components. Moreover, step 120 can be performed and/or initiated manually by a user and/or can be performed automatically in response to any instructions, events, etc. Additionally and/or alternatively, output(s) 60 and/or any other information/determinations, after being generated/determined in step 120, can be saved to and/or provided to/accessed by any location and/or user, such as storage media 22 and/or an endpoint to which users/components can subscribe. Step 120 can be performed before, during, and/or after any of the other steps of process 100. For example, step 120 can be performed concurrently with one and/or multiple of steps 106, 108, 110, 112, 114, 116, and/or 118. Moreover, step 120 can be performed once, periodically, and/or continuously as the information upon which output(s) 60 depend is updated/changed.

Process 100 can optionally include step 122. Step 122 can be a stand-a-lone process, and/or step 122 can be part of another process. Step 122 can include correcting interface descriptions, as set out in interface description database 36, in the actual network 12. Step 122 can be performed and/or initiated manually by a user/technician and/or via another method, such as through the use of system 10 and/or another component. In one example, system 10 accesses one, multiple, and/or all devices 14 of network 12 and alters/modifies interface description(s) 16C so as to correctly describe the actual state of the corresponding device 14 of network 12 as set out in interface description database 36. In another example, an IT professional/technician accesses one, multiple, and/or all devices 14 of network 12 and alters/modifies interface description(s) 16 as stated in and/or with reference to interface description database 36. Thus, in this example, interface description database 36 can be used as a list/"road map" that shows which interface descriptions 16C for which devices 14 should be changed/corrected within network 12 to accurately represent the actual state of those devices 14 and/or of network 12. Step 122 can be performed multiple times concurrently and/or in series for multiple interface descriptions 16C corresponding to multiple devices 14 of network 12. Step 122 can be performed and/or initiated manually (as described above) and/or automatically in response to any instructions, events, etc., such as in response to the generation of interface description database 36 and/or in response to the determination of one or multiple correct interface descriptions. Step 122 can be performed once, periodically, and/or continuously as correct interface descriptions are determined during process 100. In summary, step 122 can include correcting each incorrect interface description 16C of each device 14 of network 12 with the corresponding correct interface description for each device 14 dependent upon, for example, interface description database 36.

After step 122, process 100 can include step 124, which is updating ENCGD 32 with corrected interface descriptions 16C. As with step 122, step 124 can be stand-a-lone process and/or can be part of another process, such as one that includes steps 122 and 124. Step 124 can include, for example, reperforming step 102 (network discovery on network 12) and/or step 104 (accessing and/or receiving information 28). Step 124 can be performed and/or initiated manually by an IT professional/technician after one and/or multiple interface descriptions 16C have been corrected, and/or step 124 can be performed and/or initiated automatically in response to any instructions, events, etc., such as in response to the correction of one interface description 16C, the reperformance of network discovery, and/or the accessing and/or reception of information 28. Step 124 can be performed similarly to step 106 in that ENCGD 32 can be generated anew without the use of a previously generated ENCGD 32. In another configuration, step 124 can update ENCGD 32 by changing/updating only the differences between the previously generated ENCGD 32 and the information set out in newly updated network device, connectivity, and interface description information 28 (such as the updated interface descriptions 16C). Step 124 can be performed multiple times concurrently and/or in series for multiple updates of information 28 (e.g., of interface descriptions 16C in step 122) corresponding to network 12. Additionally, step 124 can be performed once, periodically, and/or continuously as updated information is determined/received (e.g., as each incorrect interface description 16C is corrected with an accurate interface description as set out in interface description database 36). In summary, step 124 can include updating ENCGD 32 with the corrected interface description(s) 16C of devices(s) 14 in response to, for example, the correction of each incorrect interface description 16C of each device 14 of network 12.

Process 100 can optionally include step 126 (or step 126 can be performed alone and/or as part of another process). Step 126 can include migrating network 12 to a network host. An owner of network 12, such as a company, may wish to migrate its network to a network host that is different than the host that's currently operating network 12. Such a migration can be difficult because the configuration of network 12 may not be known and/or easily discoverable/understandable. Step 126, migrating network 12 to a new host, can be performed by system 10 and/or with the assistance of one, multiple, or all of ENCGD 32, interface description database 36, DNCGD 40, existing network configuration graph 44, desired network configuration graph 46, and/or any other information. In one example, one or multiple IT professionals/technicians (and/or software programs, hardware programs, etc.) can perform a portion of and/or all of step 126 by referencing DNCGD 40 to understand the configuration of the actual network 12 so as to know, for example, how many of each type of devices 14 need to be hosted and/or configured. Step 126 can be performed before, during, and/or after any of the other steps of process 100. Step 126 can include, for example, switching the host of each device 14 by, for example, accessing each device 14 and reconfiguring the device 14. Step 126 can be performed on the entirety of network 12 and/or on only a portion of network 12. Additionally and/or alternatively, step 126 can be performed once or numerous times as desired. Step 126 can include other capabilities/sub-steps not described herein for migrating network 12 to a new network host.

Process 100 can include step 128, which is communicating databases 32, 36, and/or 40 and/or graphs 44 and/or 46 to at least one user. Step 128 can be performed at any time during process 100 (e.g., before, during, and/or after any other steps of process 100). Step 128 can be performed by any components of system 10, such as by LLM 50. Step 128 can include posting and/or otherwise providing any of databases 32, 36, and/or 40 and/or graphs 44 and/or 46 to an endpoint that, for example, is hosted by a gateway. The endpoint, for example, can be subscribed to by any user, component, system, etc. to gain access to the databases 32, 36, and/or 40 and/or graphs 44 and/or 46. Step 128 (i.e., communicating databases 32, 36, and/or 40 and/or graphs 44 and/or 46) can be performed once upon generation of any of the databases and/or graphs; periodically as any of the databases and/or graphs are generated, updated, and/or otherwise changed; and/or continuously whether the databases and/or graphs were updated or not. Step 128 can be performed via any other communication methods, including any wired and/or wireless communication. In one example, databases 32, 36, and/or 40 and/or graphs 44 and/or 46 are sent to at least one user via email. In another example, step 128 includes allowing access to databases 32, 36, and/or 40 and/or graphs 44 and/or 46 to at least one user via a link and/or another authorization.

Process 100 as described with regards to FIG. 2 is merely one example of generating databases 32, 36, and/or 40; graphs 44 and/or 46; and/or output(s) 60 depending on network 12. Additionally, process 100 can include other steps not expressly disclosed herein and/or can include performing the disclosed steps in any order and/or multiple times as is desired and/or necessary to generate databases 32, 36, and/or 40 and/or graphs 44 and/or 46 as well as determine output(s) 60. Process 100 can be performed by any system, such as system 10, having any components, capabilities, configurations, and/or functionalities suitable for performing process 100. Moreover, not all steps of process 100 must be performed, and process 100 can be performed partially and/or entirely in a digital environment by and/or within the systems/components set out in FIG. 1, such as graph database formulation system 10 and/or other systems/components.

The following are nonlimiting examples of the above disclosure:

One embodiment of a method of formulating a desired network configuration graph database representative of a network can include receiving network information regarding multiple devices, a connectivity of each device to other devices, and interface descriptions of the multiple devices; generating an existing network configuration graph database representative of the multiple devices, the interconnectivity of the multiple devices, and the interface descriptions; and determining whether each interface description correctly describes the device and the connectivity of each device to other devices by comparing each interface description to an actual state of the corresponding device. The method can include, in response to the interface description incorrectly describing the device or the connectivity of each device to other devices, generating an entry in an interface description database that includes identification information of the device, the incorrect interface description for the device, and a correct interface description for the device for each incorrect interface description; formulating the desired network configuration graph database representative of the multiple devices, the interconnectivity of the multiple devices, and correct interface descriptions for each device of the multiple devices; providing the desired network configuration graph database and a first prompt to a large language model; and determining, by the large language model, an output regarding the network and dependent upon the desired network configuration graph database.

The method can further include providing the existing network configuration graph database and the interface description database to the large language model, wherein the step of formulating the desired network configuration database is performed by the large language model dependent upon the existing network configuration graph database and the interface description database.

The method can further include providing a second prompt to the large language model along with the existing network configuration graph database and the interface description database, wherein the second prompt requests the large language model to formulate the desired network configuration database.

The method can further include providing a third prompt to the large language model requesting that the large language model generate a graph having multiple nodes representative of the multiple devices and multiple edge representative of connections between the multiple devices and generating, by the large language model, the graph.

The method can further include that the first prompt requests the large language model to determine why a first device of the multiple devices on the network failed to connect to a second device on the network, and wherein the output determined by the large language model is an explanation regarding the failure of the first device to connect to the second device.

The method can further include correcting each incorrect interface description of each device of the multiple devices on the network with the corresponding correct interface description for each device dependent upon the interface description database.

The method can further include updating the existing network configuration graph database with the corrected interface descriptions of the multiple devices in response to the correction of each incorrect interface description of each device of the multiple devices on the network.

The method can further include that the existing network configuration graph database is continuously updated after each incorrect interface description is corrected.

The method can further include migrating the network to a network host through the use of the desired network configuration graph database.

The method can further include performing a discovery on the network to determine the network information regarding the multiple devices, the connectivity of each device to other devices, and the interface descriptions of the multiple devices.

The method can further include automatically generating additional entries for additional devices having similar incorrect interface descriptions as previously generated entries and corresponding interface descriptions.

The method can further include that each device of the multiple devices listed in the existing network configuration graph database includes at least one of the following; a type of device, a device availability, a device state, a pool name, an IP address, and an interface description.

The method can further include that the type of device includes at least one of the following: a router, a hub, a modem, a repeater, a switch, a bridge, an access point, a gateway, a firewall, a network interface card, an intrusion detection system, an intrusion prevention system, a virtual private network, network attached storage, and a load balancer.

The method can further include generating a graph dependent upon the desired network configuration graph database with each device being represented as a node, each connection between devices being represented as an edge, and each interface description corresponding to each device being represented as additional information associated with each corresponding node.

The method can further include communicating the graph to at least one user associated with the network.

The method can further include that the output is indicative of an outcome of an event affecting the network.

Another embodiment of a method of formulating a desired network configuration graph database corresponding to a network can include receiving information regarding devices on the network, the information including at least a device name, at least one connection of the device to another device, and at least an interface description for the device;

generating an existing network configuration graph database representative of the devices on the network, the interconnectivity of the devices, and the interface descriptions of the devices; and comparing each interface description for each device to an actual state of the corresponding device on the network. The method can further include, in response to each interface description incorrectly describing the actual state of the corresponding device on the network, entering a correct interface description for each corresponding incorrect interface description for the devices in an interface description database; providing the existing network configuration graph database and the interface description database to a large language model; prompting the large language model to formulate the desired network configuration graph database that includes the information regarding the devices on the network having device names, connections of the devices to other devices, and correct interface descriptions for each device; and formulating, by the large language model, the desired network configuration graph database dependent upon the existing network configuration graph database and the interface description database.

The method can further include prompting the large language model to formulate a graph dependent upon the desired network configuration graph database with each device being represented by a node and each connection being represented by an edge and formulating, by the large language model, the graph.

The method can further include that the interface description database includes multiple entries with each entry corresponding to one incorrect interface description for one device and the associated correct interface description for that device.

The method can further include prompting the large language to determine an output regarding the network and dependent upon the desired network configuration graph database.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of formulating a desired network configuration graph database representative of a network, the method comprising:

receiving network information regarding multiple devices, a connectivity of each device to other devices, and interface descriptions of the multiple devices;

generating an existing network configuration graph database representative of the multiple devices, the interconnectivity of the multiple devices, and the interface descriptions;

determining whether each interface description correctly describes the device and the connectivity of each device to other devices by comparing each interface description to an actual state of the corresponding device;

in response to the interface description incorrectly describing the device or the connectivity of each device to other devices, generating an entry in an interface description database that includes identification information of the device, the incorrect interface description for the device, and a correct interface description for the device for each incorrect interface description;

formulating the desired network configuration graph database representative of the multiple devices, the interconnectivity of the multiple devices, and correct interface descriptions for each device of the multiple devices;

providing the desired network configuration graph database and a first prompt to a large language model; and determining, by the large language model, an output regarding the network and dependent upon the desired network configuration graph database.

2. The method of claim 1, further comprising:

providing the existing network configuration graph database and the interface description database to the large language model, wherein the step of formulating the desired network configuration database is performed by the large language model dependent upon the existing network configuration graph database and the interface description database.

3. The method of claim 2, further comprising:

providing a second prompt to the large language model along with the existing network configuration graph database and the interface description database, wherein the second prompt requests the large language model to formulate the desired network configuration database.

4. The method of claim 1, further comprising:

providing a third prompt to the large language model requesting that the large language model generate a graph having multiple nodes representative of the multiple devices and multiple edge representative of connections between the multiple devices; and generating, by the large language model, the graph.

5. The method of claim 1, wherein the first prompt requests the large language model to determine why a first device of the multiple devices on the network failed to connect to a second device on the network, and wherein the output determined by the large language model is an explanation regarding the failure of the first device to connect to the second device.

6. The method of claim 1, further comprising:

correcting each incorrect interface description of each device of the multiple devices on the network with the corresponding correct interface description for each device dependent upon the interface description database.

7. The method of claim 6, further comprising:

updating the existing network configuration graph database with the corrected interface descriptions of the multiple devices in response to the correction of each incorrect interface description of each device of the multiple devices on the network.

8. The method of claim 7, wherein the existing network configuration graph database is continuously updated after each incorrect interface description is corrected.

9. The method of claim 1, further comprising:

migrating the network to a network host through the use of the desired network configuration graph database.

10. The method of claim 1, further comprising:

performing a discovery on the network to determine the network information regarding the multiple devices, the connectivity of each device to other devices, and the interface descriptions of the multiple devices.

11. The method of claim 1, further comprising:

automatically generating additional entries for additional devices having similar incorrect interface descriptions as previously generated entries and corresponding interface descriptions.

12. The method of claim 1, wherein each device of the multiple devices listed in the existing network configuration graph database includes at least one of the following; a type of device, a device availability, a device state, a pool name, an IP address, and an interface description.

13. The method of claim 12, wherein the type of device includes at least one of the following: a router, a hub, a modem, a repeater, a switch, a bridge, an access point, a gateway, a firewall, a network interface card, an intrusion detection system, an intrusion prevention system, a virtual private network, network attached storage, and a load balancer.

14. The method of claim 1, further comprising:

generating a graph dependent upon the desired network configuration graph database with each device being represented as a node, each connection between devices being represented as an edge, and each interface description corresponding to each device being represented as additional information associated with each corresponding node.

15. The method of claim 14, further comprising:

communicating the graph to at least one user associated with the network.

16. The method of claim 1, wherein the output is indicative of an outcome of an event affecting the network.

17. A method of formulating a desired network configuration graph database corresponding to a network, the method comprising:

receiving information regarding devices on the network, the information including at least a device name, at least one connection of the device to another device, and at least an interface description for the device;

generating an existing network configuration graph database representative of the devices on the network, the interconnectivity of the devices, and the interface descriptions of the devices;

comparing each interface description for each device to an actual state of the corresponding device on the network;

in response to each interface description incorrectly describing the actual state of the corresponding device on the network, entering a correct interface description for each corresponding incorrect interface description for the devices in an interface description database;

providing the existing network configuration graph database and the interface description database to a large language model;

prompting the large language model to formulate the desired network configuration graph database that includes the information regarding the devices on the network having device names, connections of the devices to other devices, and correct interface descriptions for each device; and formulating, by the large language model, the desired network configuration graph database dependent upon the existing network configuration graph database and the interface description database.

18. The method of claim 17, further comprising:

prompting the large language model to formulate a graph dependent upon the desired network configuration graph database with each device being represented by a node and each connection being represented by an edge; and formulating, by the large language model, the graph.

19. The method of claim 17, wherein the interface description database includes multiple entries with each entry corresponding to one incorrect interface description for one device and the associated correct interface description for that device.

20. The method of claim 17, further comprising:

prompting the large language to determine an output regarding the network and dependent upon the desired network configuration graph database.

* * * * *